Patented Apr. 18, 1939

2,155,359

UNITED STATES PATENT OFFICE 2,155,359

DYESTUFFS OF THE ANTHRAQUINONE SERIES

Ralph N. Lulek, Waukesha, and Clarence F. Belcher, South Milwaukee, Wis., assignors to E. I. du Pont de Nemours & Company, Wilmington, Del., a corporation of Delaware No Drawing. Application September 30, 1936, Serial No. 103,349

4 Claims. (Cl. 260—330)

This invention relates to the preparation of new dyestuffs of the acidylaminoanthraquinone series and has for its object the preparation of new acidylaminoanthraquinone dyestuffs containing in the molecule at least one anthraquinone-2,1-thiophene-2'-carbonyl-imino or one anthraquinone-2,1-selenophene-2'-carbonyl-imino group, which dyestuffs have excellent fastness properties.

According to the present invention, anthraquinone-2,1-thiophene-2'-carbonyl chloride or anthraquinone-2,1-selenophene-2'-carbonyl chloride of the formula

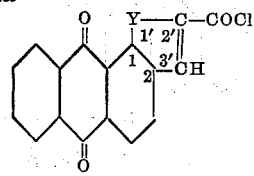

wherein Y stands for a compound of the group consisting of sulfur and selenium, which may be obtained by the process described in copending application Serial No. 103,348, is condensed with aminoanthraquinone compounds, which may be simple aminoanthraquinones or aminoanthraquinones containing additional substituents, including higher molecular aminoanthraquinone compounds such as amino derivatives of acridones, anthrimides, anthrimide-carbazoles, etc. In the main the dyestuffs obtained when the anthraquinone-thiophene acid chloride or the anthraquinone-selenophene acid chloride is condensed with the simple amino or substituted amino-anthraquinones range in shade from yellow to red and brown. When condensed with the higher molecular weight anthraquinone-amines which contain additional color imparting groups such as the aminoanthraquinone-2,1-benzacridones, dyestuffs are obtained which dye cotton in the darker shades. It is to be understood that our invention is not to be restricted to the preparation of any particular color, but contemplates generally the preparation of acidylaminoanthraquinone intermediates and dyestuffs in which at least one acidyl group is an anthraquinone-2,1-thiophene-2'-carbonyl or anthraquinone-2,1-selenophene-2'-carbonyl radical.

The following examples are given to more fully illustrate our invention. The parts used are by weight.

Example 1

10 parts of anthraquinone-2,1-thiophene-2'-carbonyl chloride are heated with 10.5 parts of monobenzoyl-1,5-diaminoanthraquinone in 150 parts of nitrobenzene to 130–135° C. for one hour. The yellow crystalline mass is then cooled to 50–60° C. and filtered. The cake is washed with nitrobenzene and alcohol and dried. The dyestuff may be reprecipitated from sulfuric acid. It dyes cotton from a violet vat in yellow shades of good fastness properties and has the following probable formula:

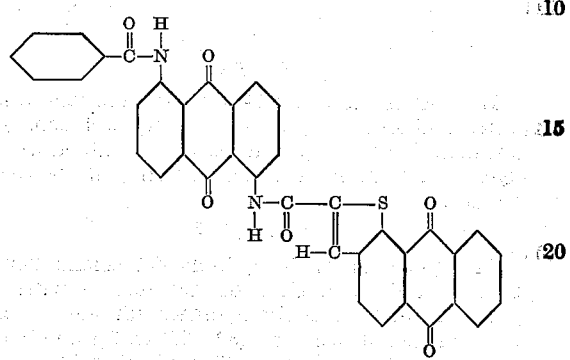

Example 2

If in the above example the monobenzoyl-1,5-diaminoanthraquinone is replaced by monobenzoyl-1,4-diaminoanthraquinone, a dyestuff is obtained dyeing cotton from a violet vat in reddish shades.

Example 3

10 parts of anthraquinone-2,1-thiophene-2'-carbonyl chloride are suspended in 150 parts of trichlorobenzene, and 8.6 parts of 1-amino-6-chloroanthraquinone are added. The mass is heated under agitation to 130–135° C. for one hour or until the formation of the new yellow dyestuff is complete. After cooling, the precipitate is filtered off, washed with trichlorobenzene and alcohol and dried. It is a yellow crystalline powder and dyes cotton from a bluish red vat in yellow shades of good fastness properties.

Example 4

10 parts of 1,5-diaminoanthraquinone and 27.5 parts of anthraquinone-2,1-thiophene-2'-carboxylic acid chloride are heated in 250 parts of nitrobenzene to 140–150° C. for one hour. The new dyestuff, di-(anthraquinone-2,1-thiophene-2'-carbonyl)-1,5-diaminoanthraquinone, is separated by filtration at 60–80° C., washed with nitrobenzene and alcohol and dried. It dyes from a bluish red hydrosulfite vat in yellow shades.

If the anthraquinone-2,1-thiophene-2'-carbonyl chloride is added to a solution of 1,5-diaminoanthraquinone in nitrobenzene at 150° C. in molecular proportions, the monoanthraquinone - 2′,1′ - thiophene-2′-carbonyl-1,5-diaminoanthraquinone is formed.

Example 5

11 parts of anthraquinone-2,1-selenophene-2′-carboxylic acid chloride are heated with 10 parts of 1-amino-5-benzoylaminoanthraquinone in 225 parts of nitrobenzene at 135–140° C. for one hour. The yellow mass is cooled to 80°, filtered, washed with nitrobenzene and alcohol and dried. The dyestuff may be reprecipitated from its solution in sulfuric acid. It dyes cotton from a violet vat in yellow shades of good fastness properties and has the following probable formula:

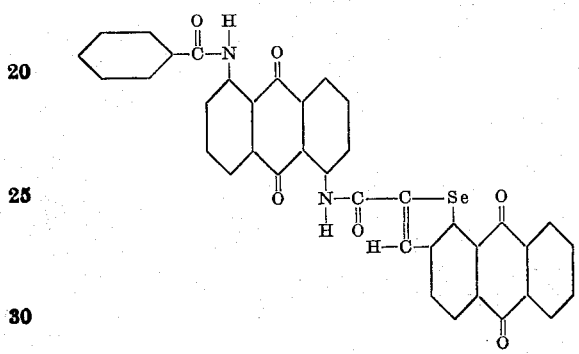

Example 6

If in Example 5 the 1-amino-5-benzoylaminoanthraquinone is replaced by 1-amino-4-benzoylaminoanthraquinone, a dyestuff is obtained which dyes cotton from a violet vat in yellow-brown shades.

Example 7

14.8 parts of anthraquinone-2,1-selenophene-2′-carboxylic acid chloride are heated with 10 parts 1-amino-4-methoxyanthraquinone in 225 parts of nitrobenzene at 130–135° C. for one hour. The red-yellow product is filtered off at 50–60° C., washed with nitrobenzene and alcohol and dried. It dyes cotton from a bluish red vat in orange shades of good fastness properties.

Example 8

10 parts of anthraquinone-2,1-selenophene-2′-carboxylic acid chloride and 6.4 parts of 1,4-diaminoanthraquinone are stirred together in 150 parts of nitrobenzene at 140–150° C. for a period of one hour. The brown product is collected by filtration, washed with nitrobenzene and alcohol and dried. It dyes cotton from a dark blue violet vat in brown shades.

The following list of aminoanthraquinone compounds which may be substituted for those used in the examples is given to illustrate the broad scope of our invention: 1-aminoanthraquinone; 2-aminoanthraquinone; 1-amino-4-methoxyanthraquinone; 1-amino-5-chloroanthraquinone; 1-amino-4-chloroanthraquinone; 1-amino-2-chloroanthraquinone; 1,5-diamino-4,8 - dichloroanthraquinone; 1,5-diamino-4-hydroxyanthraquinone; 1,5-diamino-4,8-dihydroxyanthraquinone; 1,4-diaminoanthraquinone; Bz1-aminobenzanthrone; 1,9-anthraisothiazole-4-amine; 4, 5 or 8-aminoanthraquinone-2,1-benzacridone.

This application is a continuation-in-part of our copending application Serial No. 27,815 filed June 21, 1935.

We claim:

1. The process for producing vat dyestuffs which comprises condensing an aminoanthraquinone compound with a compound of the class consisting of anthraquinone-2,1-thiophene-2′-carbonyl chloride and anthraquinone-2,1-selenophene-2′-carbonyl chloride.

2. Compounds of the general formula

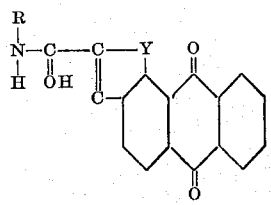

wherein R represents an anthraquinone radical and Y stands for an element of the group consisting of sulfur and selenium.

3. Compounds of the formula

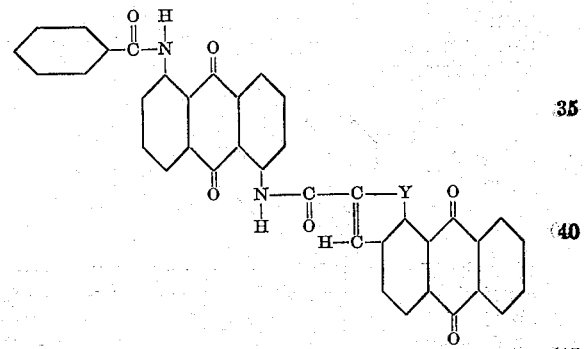

wherein Y stands for an element of the group consisting of sulfur and selenium.

4. The compound of the formula

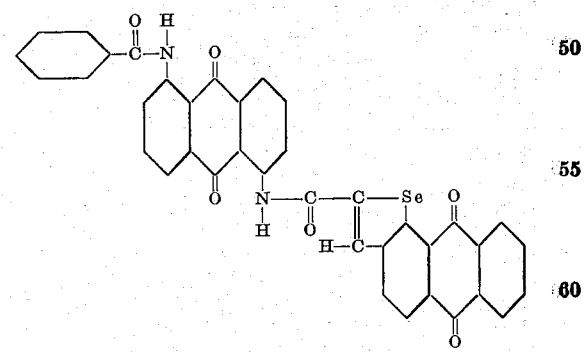

RALPH N. LULEK.
CLARENCE F. BELCHER.